United States Patent
Jadunandan et al.

(10) Patent No.: US 9,585,034 B1
(45) Date of Patent: Feb. 28, 2017

(54) AUTOMATED RESPONSE SYSTEM DEACTIVATION DURING LARGE SCALE ISSUES AND MANAGING WIRELESS NETWORK OPERATIONS

(71) Applicant: Sprint Communications Company L.P., Overland Park, KS (US)

(72) Inventors: Kevin V. Jadunandan, Palm Bay, FL (US); Shane A. Lobo, Ponte Vedra, FL (US); Robert Dennis Lumpkins, Marietta, GA (US); Brian D. Lushear, Winter Springs, FL (US); P. A. Shinholster, Jr., Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/750,700

(22) Filed: Jun. 25, 2015

(51) Int. Cl.
H04W 24/04 (2009.01)

(52) U.S. Cl.
CPC ................... *H04W 24/04* (2013.01)

(58) Field of Classification Search
CPC .................................................. H04W 24/04
USPC ........................................................ 370/216
See application file for complete search history.

(56) References Cited

U.S. PATENT DOCUMENTS

| | | | | |
|---|---|---|---|---|
| 8,170,544 B1 * | 5/2012 | Satapathy | ............. | H04W 24/08 455/423 |
| 2005/0201299 A1 * | 9/2005 | Radi | ....................... | H04L 41/12 370/254 |

FOREIGN PATENT DOCUMENTS

SE     WO 9631988     * 10/1996     ............... H04Q 7/34

\* cited by examiner

*Primary Examiner* — Ronald B Abelson

(57) ABSTRACT

A method of suspending automated corrective actions by a monitoring application is disclosed. The method comprises a monitoring application executing on a monitoring server a count of errors that lead to alarms experienced by each of a plurality of enhanced node Bs (eNBs) from a network management system (NMS), wherein the NMS records the count of errors experienced by the eNBs result in alarms. The method comprises the monitoring application determining that a pre-defined number of the plurality of eNBs have each exceeded a pre-defined threshold for alarms. The method comprises the monitoring application suspending automated corrective actions on the plurality of eNBs. The method comprises the monitoring application, responsive to suspending automated corrective actions, initiating corrective actions that are associated with the error experienced by the plurality of eNBs.

20 Claims, 4 Drawing Sheets

AUTOMATED RESPONSE SYSTEM DEACTIVATION DURING LARGE SCALE ISSUES AND MANAGING WIRELESS NETWORK OPERATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Base transceiver stations, also known as enhanced node Bs, facilitate wireless communication between a network, communication servers with internet connectivity, user equipment such as mobile phones, and other equipment. Components of base transceiver stations comprise transceivers, antennas, routers, alarm extension systems, and other components. Transceivers function in the transmission and reception of signals to the base transceiver station. Alarm extension systems collect working status alarms of various components of the base transceiver station and extend these alarms to monitoring stations. Fiber cuts may be accidental breaks in optical fiber that function as a part of the network. Fiber cuts may occur as a result of construction and cause a loss of connectivity to the network for communication servers or base transceiver stations.

SUMMARY

In an embodiment, a monitoring server is disclosed. The monitoring server comprises a processor, a memory, and an application stored in the memory, that when executed by the processor receives a count of alarms experienced by each of a plurality of enhanced node Bs (eNBs) from a network management system (NMS), wherein the NMS records the count of errors experienced by the eNBs that result in alarms. The application determines that at least one of the plurality of eNBs has exceeded a pre-defined threshold for errors during a pre-defined period of time. The application determines a type of the error(s) experienced by the at least one eNB. The application, responsive to determining that the at least one eNB has exceeded the pre-defined threshold for errors and determining the type of error(s) experienced by the at least one eNB, resets at least one component of the eNB. The application, responsive to determining that the at least one eNB has exceed the predefined threshold for alarms and determining the type of alarm(s) experienced by the at least one eNB, determining that the at least one eNB has had corrective actions performed on it that exceed a pre-defined threshold for corrective actions performed during a pre-defined period of time, wherein the corrective actions taken are the same corrective actions. The application, responsive to determining that the at least one eNB has exceed the pre-defined threshold for corrective actions performed during a pre-defined period of time, suspending corrective actions for the eNB that has exceeded the pre-defined threshold for corrective actions taken during a pre-defined period of time.

In an embodiment, a method of suspending automated corrective actions by a monitoring application is disclosed. The method comprises a monitoring application executing on a monitoring server receiving a count of errors that lead to alarms experienced by each of a plurality of enhanced node Bs (eNBs) from a network management system (NMS), wherein the NMS records the count of errors experienced by the eNBs that result in alarms. The method comprises the monitoring application determining that a pre-defined number of the plurality of eNBs have each exceeded a pre-defined threshold for alarms. The method comprises the monitoring application suspending automated corrective actions on the plurality of eNBs. The method comprises the monitoring application, responsive to suspending automated corrective actions, initiating corrective action that are associated with the error experienced by the plurality of eNBs.

In an embodiment, a method of suspending automated corrective actions and initiating corrective actions is disclosed. The method comprises a monitoring application executing on a monitoring server receiving a count of errors resulting in alarms experienced by a plurality of enhanced node Bs (eNBs) from a network management system (NMS) server, wherein the NMS records the count of errors experienced by the plurality of eNBs that result in alarms, wherein the NMS records the count of corrective actions taken on each of the plurality of eNBs that exceed a pre-defined threshold for errors that result in alarms. The method comprises the monitoring application determining that one of the plurality of eNBs has had corrective actions performed on it that exceed a pre-defined threshold for the number of corrective actions performed during a pre-defined period of time, wherein the corrective actions taken that exceed the pre-defined threshold for corrective actions taken are the same corrective actions. The method comprises the monitoring application suspending automated corrective actions for the eNB that has exceeded the pre-defined threshold for corrective taken during a pre-defined period of time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
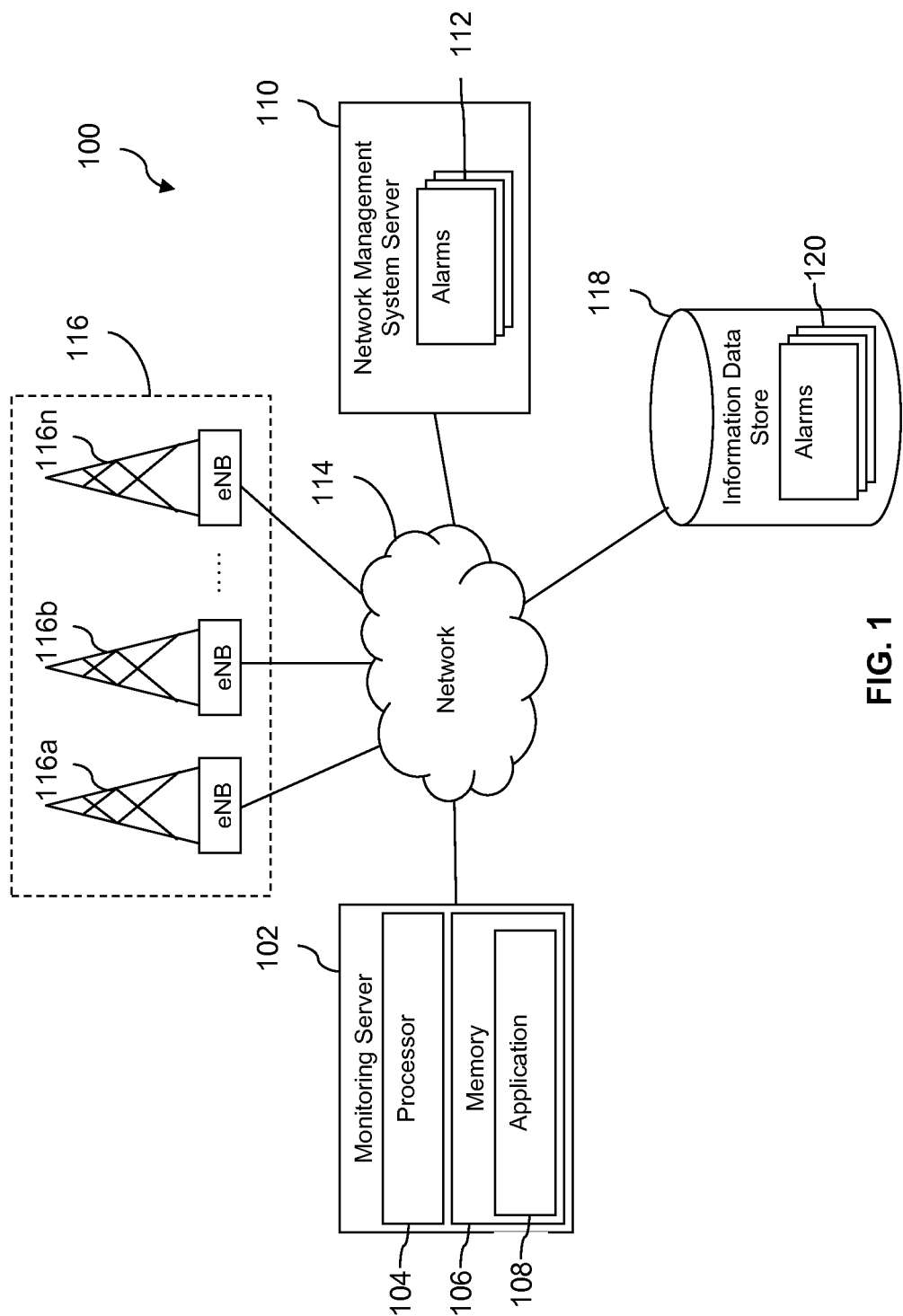
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods that promotes suspending automated corrective actions performed on communication devices by a monitoring application. Sophisticated network monitoring creates opportunities and challenges. The opportunity to let machines more rapidly and automatically fix issues is a real benefit, but in some instances because the fixing of issues occurs so quickly and somewhat out of the view of the people that are supporting the systems, it can have unintended negative effects. In part, the present disclosure attempts to both assist in identifying potential issues for automatic corrections, but also monitor the same and additional criteria/characteristics and using the additional information and insight to suspend some automatic corrections to actually improve network performance.

Some automatic corrections may not properly address errors that occur on communication devices, allowing them to persist. Communication devices may comprise enhanced node Bs (eNBs), routers, communication servers, communication gateways, and other devices. The monitoring application assists in identifying when automatic corrections are ineffective. The monitoring application suspends the automatic corrections so that corrective actions may be taken to properly address errors that are not being fixed by the automatic corrections.

The monitoring application executes on a monitoring server. The monitoring application monitors alarms experienced by communication devices that function as a part of a network. The communication devices may be associated with a telecommunication service provider. The monitoring application receives or retrieves the count of alarms from a network management system (NMS) server. The NMS receives a count of errors from the communication devices. Based on the count of errors experienced by each of the communication devices, the NMS determines if a count of errors for each of the communication devices has exceeded a pre-defined threshold for errors that may be experienced by each communication device; or that one or more communication devices experiences certain types of errors. Errors that the NMS monitors may comprise communication slowdown experienced by the communication devices, disconnection experienced by the communication devices, excessive call drop rate, an excessive call block rate, and other errors. If the count of errors has exceeded a pre-defined threshold for errors, or a certain error is experienced, the NMS raises an alarm for the communication device(s) that is experiencing the errors. The NMS may propagate the alarms and store a record of them to an internal memory of the NMS. The NMS may also store the record of the alarms to an information data store, and/or transmit the record to the monitoring application. The monitoring application may check the records of alarms in the information data store or the internal memory of the NMS.

In an embodiment, the monitoring application also monitors the count of errors experienced by each of the communication devices. The monitoring application functions as an automated response system. The automated response system functionality allows the monitoring application to initiate corrective actions on communication devices that exceed a pre-defined threshold for errors. Communication devices that exceed the threshold for errors may have automated corrective actions that are performed on them that are initiated by the monitoring application. Corrective actions may comprise the monitoring application rebooting or resetting the entire communication device, rebooting or resetting particular components of the communication device that exceeds the threshold for errors, locking or unlocking a cell, or changing a configuration parameter. Locking or unlocking a cell is administratively shutting down and then re-enabling a particular cell/sector of a communication device, e.g., a cell tower such as a base transceiver station (BTS) or an enhanced node B (eNB). Changing configuration parameters may comprise increasing or decreasing the threshold for errors allotted to a communication device, increasing or decreasing the power output of a communication device, and other parameters. The monitoring application receives the count of errors for the communication devices from the NMS.

The monitoring application also evaluates the count of alarms triggered by the NMS. The monitoring application receives the count of alarms for the communication devices from the NMS. The monitoring application determines if the count of alarms has exceeded a pre-defined threshold for the count of alarms for each of the communication devices. If the count of alarms has exceeded the pre-defined threshold, the monitoring application delays or suspends corrective actions that the monitoring application normally commands. Corrective actions taken by the monitoring application may comprise rebooting a component of the communication device, or rebooting the entirety of the communication device, e.g., an eNB taken offline. The monitoring application then sends a notification to an engineer or engineers that are able to address the device(s) that has exceeded the pre-defined threshold for alarms. In an embodiment, there are several pre-defined thresholds that the monitoring application is using to evaluate the communication devices. There may be a threshold for alarms experienced by devices at a metropolitan level, a regional level, and a national level. At a metropolitan level, there may be twenty communication devices or another number of communication devices. At a regional level, there may be four-hundred communication devices or another number of communication devices. At a national level, there may be sixty-thousand communication devices or another number of communication devices. The thresholds for corrective actions at geographical levels are in reference to the number of communication devices that are exceeding the threshold for alarms experienced by the communication devices. There may be a threshold for alarms experienced by a pre-defined number of devices that are adjacent to each other. Communication devices may be considered adjacent when they are next to each other within a pre-defined range of distance.

The monitoring application may delay or suspend corrective actions that it commands on the problem communication devices so that engineers may evaluate the communication devices. It is possible that the problem communication devices are experiencing an error or errors that may not be addressed by the corrective actions that the communication devices initiate. An example of errors that may not be able to be fixed by the corrective actions taken by the communication device may be a fiber cut, a network blackout, or other errors. If the communication devices continue to perform ineffective corrective actions, additional damage or harm may occur and deterioration of network performance may be experienced.

In an embodiment, the monitoring application may also monitor the number of corrective actions that it initiates on a communication device during a pre-defined period of time.

If the number of corrective actions taken on a communication device exceeds a pre-defined threshold for corrective actions taken during a pre-defined period of time, the monitoring application may delay or suspend further corrective actions and send a notification to an engineer or engineers that may evaluate the problem communication device. In an embodiment, the pre-defined number for the number of corrective actions taken by the monitoring application during a pre-defined period of time may be two corrective actions, five corrective actions, ten corrective actions, fifty corrective actions, one-hundred corrective actions, or another pre-defined number of corrective actions. In an embodiment, the pre-defined period of time that the monitoring application may determine the number of corrective actions taken by the monitoring application on a communication device may be one day, one week, one month, six months, one year, or another pre-defined period of time. In an embodiment, the monitoring application may determine that the corrective actions taken by the communication device are the same or similar corrective actions. A record of the corrective actions taken by the monitoring application on communication devices may be stored to an internal memory of the NMS or to an external information data store. The monitoring application may send a notification to an engineer(s) that is associated with the communication device. The monitoring application may delay or suspend corrective actions taken by the monitoring application to allow an engineer(s) to evaluate the communication device. The corrective actions may be ineffective, and an engineer or engineers may need to evaluate the communication device to determine if there is an error that cannot be addressed by the corrective actions of the monitoring application. If the corrective actions are allowed to persist, additional harm or damage and reduced network performance may be experienced.

Systems prior to the monitoring application may have allowed the monitoring application to perform corrective actions on the communication devices without being able to determine or recognize the corrective actions were not effective. The previous systems may have allowed an error such as a fiber cut to negatively affect the network and the communication devices in a persistent manner. The errors such as a fiber cut may only have been caught by a human evaluating the record of alarms.

With the monitoring application, telecommunications service providers may be able to promote the proactive delay or suppression of automated corrective actions taken by the monitoring application. This occurs when the communication devices exceed a pre-defined threshold for alarms based on several thresholds. The monitoring application determines that communication devices have exceeded one of the several pre-defined thresholds for alarms or corrective actions taken, delays or suspends corrective actions initiated by the communication devices, and sends a notification to an engineer or engineers that can evaluate the problem communication devices. By exceeding the pre-defined thresholds for alarms, it is possible that the communication devices are experiencing an error that the corrective actions may not be able to fix and would benefit from having an engineer evaluate the communication device. By proactively delaying or suspending ineffective corrective actions and sending a notification to an engineer to evaluate the problem communication device, errors that could cause damage to the network or the communication devices may be caught and further damage to the network or the communication devices may be avoided.

Turning now to FIG. 1, a communication system 100 is described. In an embodiment, the system 100 comprises a monitoring server 102. The monitoring server 102 comprises a processor 104, and a memory 106 that further comprises a monitoring application 108. The system 100 further comprises a network management system (NMS) server 110 that further comprises a plurality of alarms or alerts 112 stored to a memory of the NMS 110. The system 100 further comprises an information data store 118 that further comprises a record of a plurality of alarms or alerts 120. The system 100 further comprises a network 114 and a plurality of enhanced node Bs (eNBs) 116 that are represented by an eNB 116a, an eNB 116b, and an eNB 116n.

The monitoring server 102 via the monitoring application 108 monitors alarms 112 which are propagated by the NMS 110. The monitoring application 108 may also function as an automated response system that initiates corrective actions on the eNBs 116 when the eNBs 116 exceed a pre-defined threshold for errors experienced by the eNBs 116. The monitoring application 108 receives the count of errors from the NMS 110. The NMS 110 monitors the eNBs 116. The NMS 110 may function on a processing server or another kind of server. The NMS 110 initiates the alarms 112 due to errors experienced by the eNBs 116. Each of the eNBs 116 report errors that they experience to the NMS 110. The NMS 110 may raise an alarm 112 if certain error thresholds are exceeded. The NMS 110 keeps a record of both the errors experienced by the each of the eNBs 116 and the alarms 112 that the NMS 110 raises. The thresholds may comprise a pre-defined number of errors being exceeded by one or more of the eNBs 116 over a pre-defined period of time, a certain kind of error occurring on one or more of the eNBs 116, and adjacent eNBs such as the eNBs 116a and 116b experiencing similar errors. eNBs 116 may be considered adjacent if they are within a pre-defined geographic distance from each other or eNBs 116 that are next to each other, geographically. The pre-defined distance for eNBs 116 to be adjacent may be one mile, two miles, five miles, ten miles, or another pre-defined distance. If these thresholds are met or exceeded, the NMS 110 raises an alarm 112. The alarm 112 may be recorded and stored to an internal memory of the NMS 110 as part of the plurality of alarms 112 by the NMS 110. The alarms 112 may also be stored to the information data store 118 as the plurality of alarms 120 by the NMS 110.

The monitoring application 108 monitors and evaluates the alarms 112 to see if the alarms 112 meet or exceed several pre-defined thresholds. The NMS 110 may send a record of alarms 112 to the monitoring application 108. The monitoring application 108 may access the alarms 112 stored to the NMS 110 or access the alarms 120 that are stored to the information data store 118. The thresholds that the monitoring application 108 evaluates the alarms 112 by may comprise a pre-defined number of the eNBs 116 exceeding a pre-defined number of alarms 112 over a pre-defined period of time. The pre-defined number of alarms 112 may be one alarm 112, two alarms 112, five alarms 112, ten alarms 112, or another number of alarms 112. The pre-defined period of time that the alarms 112 are monitored by the monitoring application may comprise one minute, five minutes, ten minutes, thirty minutes, one hour, six hours, a day, or another period of time.

In an embodiment, there may be several levels of increasing numbers of eNBs 116 based on their geographical placement. These levels may comprise a metropolitan level of eNBs 116 that may comprise twenty eNBs 116, a regional level of eNBs 116 that may comprise four-hundred eNBs 116, and a national level of eNBs 116 that may comprise sixty-thousand eNBs 116. The monitoring application 108 may evaluate the alarms 112 at these several different levels to see if a pre-defined number of eNBs 116 has exceeded an alarm threshold for each level. There may also be a pre-defined threshold for a count of eNBs 116 that are experiencing alarms based on the geographical level of each of the eNBs 116. For example, the threshold for eNBs 116 experiencing alarms 112 on a metropolitan level may be greater than or equal to five eNBs 116. The threshold for alarms 112 on a regional level may be greater than or equal to twenty eNBs 116. The threshold for alarms 112 on a national level may be greater than or equal to five-thousand eNBs 116. There may be a pre-defined period of time that the alarms 112 are evaluated by may be one minute, five minutes, ten minutes, one hour, six hours, twelve hours, one day, one week, one month, or another period of time. If the thresholds for any of these different levels are exceeded, the monitoring application 108 may delay or suspend the problem eNBs 116. The monitoring application 108 sends a notification to an engineer(s) that is associated with the problem eNBs 116. The engineer(s) may evaluate the problem eNBs 116 to find out why alarms 112 are being triggered. In an embodiment, the delay of corrective actions taken by the monitoring application 108 is a pre-defined period of time that the monitoring application 108 does not perform corrective actions on the eNBs 116. The monitoring application 108 may suspend the corrective actions it commands and send a notification to an engineer(s) that is associated with the problem eNBs 116. The monitoring application 108 may not perform corrective actions while suspended. The monitoring application 108 may not remove the suspension to perform corrective actions on the problem eNBs 116 until it receives a notification from the engineers that evaluate the problem eNBs 116 that the monitoring application 108 may resume the performance of corrective actions on the eNBs 116.

In an embodiment, there may be a threshold of alarms 112 for each of the eNBs 116. The pre-defined threshold may be one alarm 112, two alarms 112, five alarms 112, ten alarms 112, fifty alarms 112, one-hundred alarms 112, or another number of alarms 112. The monitoring application may monitor the number of alarms 112 of each of the eNBs 116 over a pre-defined period of time. The pre-defined period of time may be one minute, one hour, one day, two days, one week, one month, six months, one year, or another pre-defined period of time. In an embodiment, another threshold that the monitoring application 108 may use to evaluate the alarms 112 is a type of error that occurs on at least one of the eNBs 116. The types of errors that the monitoring application 108 looks for may comprise communication slowdown, failure to send or receive messages, an excessive call drop rate, an excessive call block rate, and other errors. The NMS 110 may record the errors as a part of the alarms 112. The NMS 110 may organize the alarms 112 by the region where the eNBs 116 experienced the errors. The NMS 110 may also be organize the alarms 112 according to a time that the alarms 112 took place.

If any of the pre-defined thresholds are exceeded, the monitoring application 108 suspends corrective actions for each of the eNBs 116 that has exceeded the pre-defined thresholds. In an embodiment, each of the eNBs 116 under the command of the auto response system of the monitoring application 108 may initiate corrective actions when they experience an error. Corrective actions that the each of the eNBs 116 initiate may comprise resetting a component of the eNB 116, e.g., a transceiver of the eNB 116, or resetting the entirety of the eNB 116. In an embodiment, the amount of time that the eNB 116a is delayed or suspended from taking corrective actions may be a pre-defined period of time. The pre-defined period of time for a delay may be an hour, two hours, six hours, twelve hours, a day, or another period of time. The monitoring application 108 sends a notification to an engineer(s) that is associated with the problem eNB, e.g., the eNB 116a. The corrective actions of the eNB 116a may remain delayed for the pre-defined period of time. The monitoring application 108 may receive a notification from the engineer that is associated with eNB 116a that the eNB 116a has been evaluated and addressed, whereby the monitoring application 108 removes the suspension on itself and may resume initiating corrective actions for the eNB 116a.

In an embodiment the monitoring application 108 may monitor and evaluate corrective actions that are taken on each of the eNBs 116 by the monitoring application 108. The NMS server 110 may record and store a record of the corrective actions taken on the eNBs 116 to the internal memory of the NMS server 110 or to the information data store 118 as part of the alarms 112 or the alarms 120. The monitoring application 108 may access this record in order to evaluate the corrective actions performed on each of the eNBs 116. The monitoring application 108 may determine that one of the eNBs 116 has exceeded a pre-defined threshold for corrective actions taken during a pre-defined period of time. The threshold for corrective actions taken during a pre-defined period of time may be one corrective action, five corrective actions, ten corrective actions, fifty corrective actions, one-hundred corrective actions, or another number of corrective actions during a period of time. The pre-defined period of time may comprise one day, one week, one month, or another pre-defined period of time. The monitoring application 108 may also monitor the kind of corrective action taken by the eNBs 116, noting when the consecutive corrective actions taken by each of the eNBs 116 are the same corrective actions.

If one of the eNBs 116 has exceeded the pre-defined threshold for corrective actions performed on it during a pre-defined period of time, the monitoring application 108 may delay or suspend initiation of corrective actions by the application 108 on the eNB 116, for example, the eNB 116a. The monitoring application 108 may send out a notification to an engineer(s) that is associated with the eNB 116a that can evaluate the eNB 116a. If the eNB 116a is performing corrective actions to the point that the number of corrective actions taken exceeds the pre-defined threshold of the monitoring application 108, the eNB 116a may be experiencing an error that cannot be addressed by the corrective actions that the monitoring application 108 takes. The monitoring application 108 suspends the corrective actions of the eNB 116a, sends the notification to the engineer(s) that is associated with the eNB 116a and allows the engineer(s) to evaluate the eNB 116a for reasons that the same errors are occurring, triggering alarms 112 and corrective actions. In an embodiment, the amount of time that the monitoring application 108 delays or suspends initiating corrective actions on the eNB 116a may be a pre-defined period of time. The pre-defined period of time may be an hour, two hours, six hours, 12 hours, a day, or another pre-defined period of time. The monitoring application 108 may receive a notification from the engineer that is associated with eNB 116a that the eNB 116a has been evaluated, addressed, and may return to operation. The engineer may be able to override the suspension of the monitoring application 108 by his/her self.

The eNBs 116 may provide a communicative link to other communication devices that function on the network 114.

The information data store 118 may store the alarms 120 that it receives from the NMS 110. The monitoring application 108 may access the information data store 118 to monitor and evaluate the alarms 120. The eNBs 116 may function as a radio access network. While eNBs 116 are discussed in the system 100 and illustrated in FIG. 1, it is understood that other wireless base stations that provide communicative links to communication devices may be monitored as well by the NMS 110 and the monitoring server 102, e.g., base transceiver stations (BTSs). The information data store 118 may store a record of the corrective actions taken by each of the eNBS 116 which the information data store 118 receives from the NMS 110. The NMS 110 may monitor other communication devices that function as a part of the network 114. The other communication devices may comprise routers, nodes, communication servers, and other communication devices. While one monitoring server 102, one NMS 110, one information data store 118, and three eNBs 116 are illustrated in FIG. 1, it should be understood that the system 100 may comprise any number of monitoring servers 102, NMS 110, information data stores 118, and eNBs 116.

In an embodiment, the monitoring application 108 is executed by the processor 104 of the monitoring server 102. The application 108 may receive a count of alarms 112 experienced by each of a plurality of eNBS 116 from the NMS 110. The NMS 110 monitors the eNBs 116 and propagates alarms 112 based on errors experienced by the eNBs 116. The monitoring server 102 via the monitoring application 108 may monitor the alarms 112/120 and corrective actions taken, itself. The monitoring application 108 determines that at least one of the eNBs 116 has exceeded the pre-defined threshold for alarms 112 experienced during a pre-defined period of time. The monitoring application 108 may determine the type of error that the at least one eNB 116, for example the eNB 116a experienced. The monitoring application 108, responsive to determining that the at least one eNB 116a has exceeded the pre-defined threshold for alarms 112 may suspend corrective actions that the monitoring application 108 would initiate. The monitoring application 108 may send a notification to an engineer that is associated with the eNB 116a that is able to evaluate and address the errors that the eNB 116a is experiencing.

Figure 2:
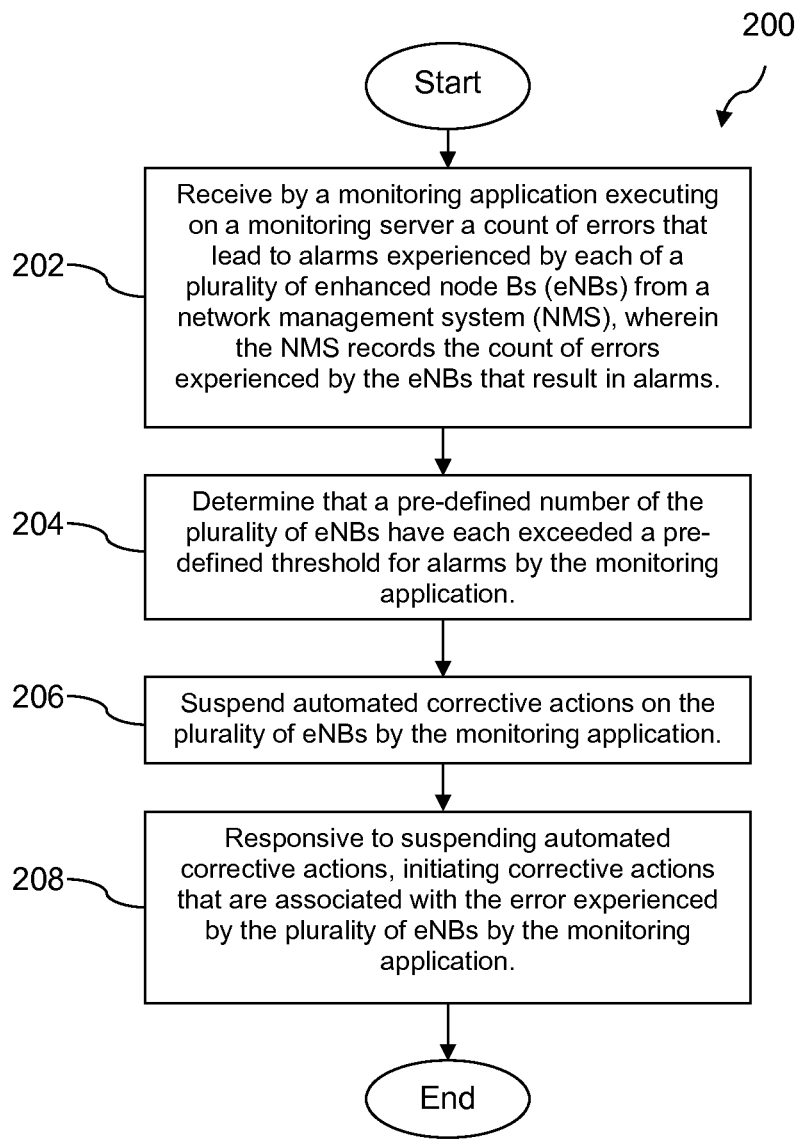
FIG. 2 is a flow chart of a method according to an embodiment of the disclosure.

In FIG. 2, a method 200 is described. At block 202 a monitoring application executing on a monitoring server receives a count of errors that lead to alarms experienced by each of a plurality of enhanced node Bs (eNBs) from a network management system (NMS), wherein the NMS records the count of errors experienced by the eNBs that result in alarms. At block 204, the monitoring application determines that a pre-defined number of the plurality of eNBs have each exceeded a pre-defined threshold for alarms. At block 206, the monitoring application suspends automated corrective actions on the plurality of eNBs. At block 208, the monitoring application, responsive to suspending automated corrective actions, initiates corrective actions that are associated with the error experienced by the plurality of eNBs. The monitoring application may send out a notification to an engineer that is associated with the eNBs, so that the engineer may evaluate.

Figure 3:
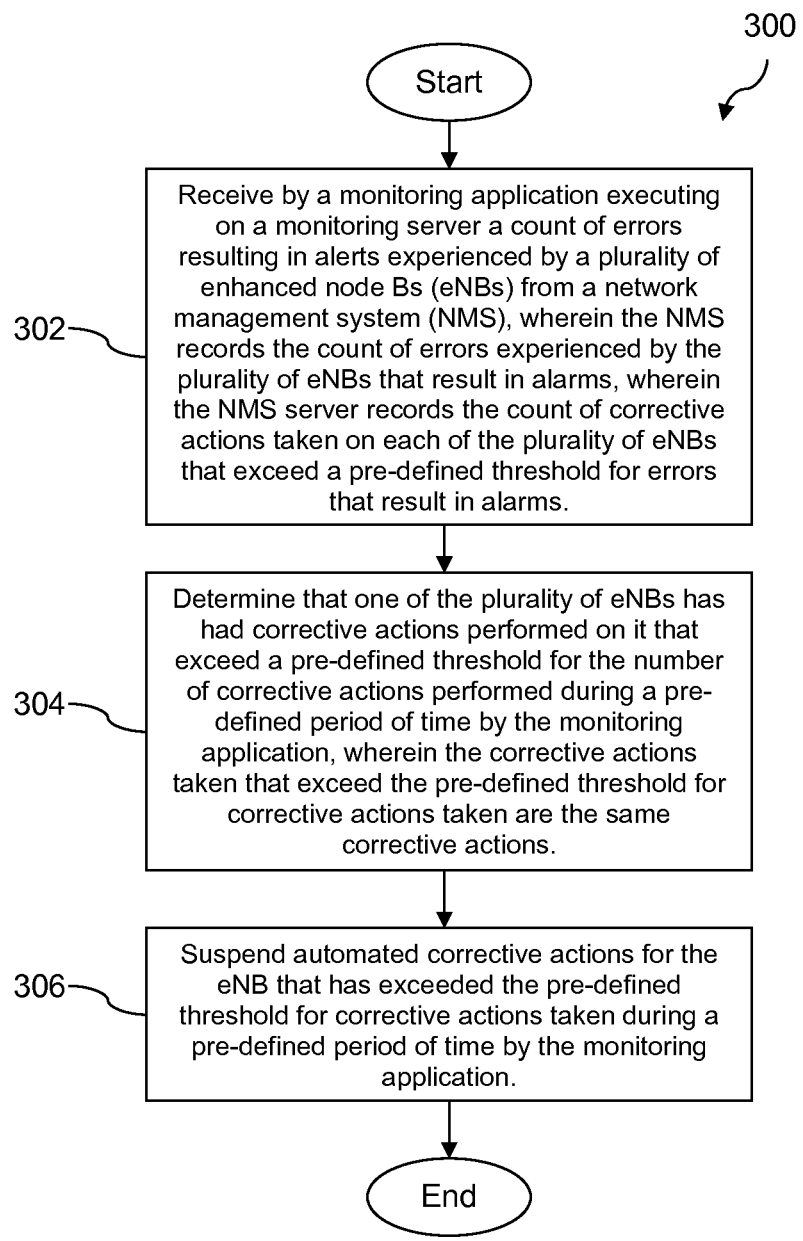
FIG. 3 is a flow chart of a method according to an embodiment of the disclosure.

In FIG. 3, a method 300 is described. At block 302, a monitoring application executing on a monitoring server receives a count of errors resulting in alarms experienced by a plurality of enhanced node Bs (eNBs) from a network management system (NMS) server, wherein the NMS records the count of errors experienced by the plurality of eNBs that result in alarms, wherein the NMS records the count of corrective actions taken on each of the plurality of eNBs that exceed a pre-defined threshold for errors that result in alarms. At block 304, the monitoring application determines that one of the plurality of eNBs has had corrective actions performed on it that exceed a pre-defined threshold for the number of corrective actions performed during a pre-defined period of time, wherein the corrective actions taken that exceed the pre-defined threshold for corrective actions taken are the same corrective actions. At block 306, the monitoring application suspends automated corrective actions for the eNB that has exceeded the pre-defined threshold for corrective actions taken during a pre-defined period of time.

Figure 4:
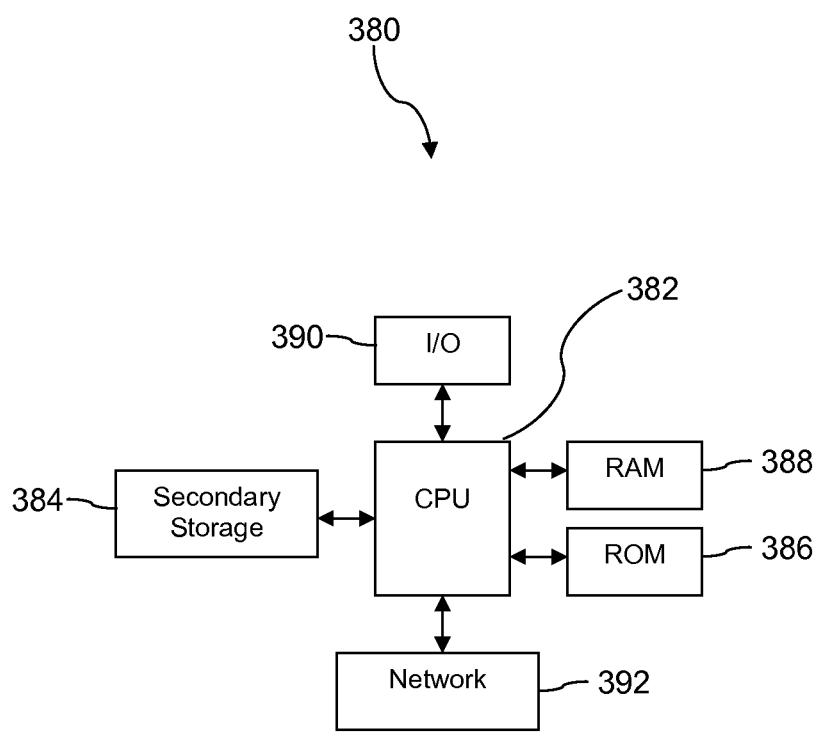
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A monitoring server, comprising:
   a processor,
   a memory,
   an application stored in the memory, that when executed by the processor,
      receives a count of errors that lead to alarms experienced by each of a plurality of enhanced node Bs (eNBs) from a network management system (NMS), wherein the NMS records the count of errors experienced by the eNBs that result in alarms,
      determines that at least one of the plurality of eNBs has exceeded a pre-defined threshold for alarms during a pre-defined period of time,
      determines a type of the alarm(s) experienced by the at least one eNB,
      responsive to determining that the at least one eNB has exceeded the predefined threshold for alarms and determining the type of alarm(s) experienced by the at least one eNB, resets at least one component of the eNB,
      responsive to determining that the at least one eNB has exceeded the predefined threshold for alarms and determining the type of alarm(s) experienced by the at least one eNB, determines that the at least one eNB has had corrective actions performed on it that exceed a pre-defined threshold for corrective actions performed during a pre-defined period of time, wherein the corrective actions taken are the same corrective actions, and
      responsive to determining that the at least one eNB has exceeded the pre-defined threshold for corrective actions performed during the pre-defined period of time, suspending further corrective actions for the at least one eNB that has exceeded the pre-defined threshold for corrective actions taken during the pre-defined period of time.

2. The method of claim 1, wherein the NMS records error counts of other network communication devices.

3. The method of claim 2, wherein the other network communication devices comprise wireless nodes, routers, communication gateways, and communication servers.

4. The method of claim 1, wherein the monitoring application functions as an automated response system that initiates corrective actions on an eNB of the plurality of eNBs when the eNB exceeds a pre-defined threshold for errors.

5. The method of claim 1, wherein the errors that lead to alarms comprise communication slowdown by the at least one eNB, failure to send or receive messages, excessive call block rate, and excessive call drop rate.

6. The method of claim 1, wherein the pre-defined threshold for alarms comprises one of at least one alarm, five alarms, ten alarms, fifty alarms, and one-hundred alarms.

7. The method of claim 1, wherein the pre-defined period of time comprises one of a minute period, a five minute period, a ten minute period, a thirty minute period, and an hour period.

8. A method of suspending automated corrective actions by a monitoring application, comprising:
   receiving, by a monitoring application executing on a monitoring server, a count of errors that lead to alarms experienced by each of a plurality of enhanced node Bs (eNBs) to a network management system (NMS), wherein the NMS records the count of errors experienced by the eNBs that result in alarms;
   determining, by the monitoring application, that each eNB of a pre-defined number of the plurality of eNBs has exceeded a pre-defined threshold for alarms;
   responsive to determining that each eNB of the pre-defined number of the plurality of eNBs has exceeded the pre-defined threshold for alarms, suspending, by the monitoring application, automated corrective actions on each eNB of the pre-defined number of the plurality of eNBs; and
   responsive to suspending the automated corrective actions, initiating, by the monitoring application, at least one corrective action that is associated with at least some the errors experienced by the plurality of eNBs.

9. The method of claim 8, wherein the NMS stores the count of errors in an internal memory of the NMS.

10. The method of claim 8, wherein the NMS stores the count of errors in an information data store.

11. The method of claim 9, wherein the alarms are organized according to a region where the alarms take place.

12. The method of claim 9, wherein the alarms are organized according to a time that the alarms take place.

13. The method of claim 8, wherein the at least one corrective action that the monitoring application initiates is sending a notification to an engineer(s) that is associated with the plurality of eNBs to evaluate the plurality of eNBs.

14. The method of claim 8, wherein the monitoring application suspends the automated corrective actions for a period of time, resulting in a delay of the automated correct actions.

15. A method of suspending automated corrective actions and initiating corrective actions by a monitoring application, comprising:

receiving, by a monitoring application executing on a monitoring server, a count of errors resulting in alarms experienced by a plurality of enhanced node Bs (eNBs) to a network management system (NMS), wherein the NMS records the count of errors experienced by the plurality of eNBs that result in alarms, and wherein the NMS records a count of corrective actions taken on each of the plurality of eNBs that exceed a pre-defined threshold for errors that result in alarms;

determining, by the monitoring application, that an eNB of the plurality of eNBs has had corrective actions performed on it that exceed a pre-defined threshold for corrective actions performed during a pre-defined period of time, wherein the corrective actions taken that exceed the pre-defined threshold for corrective actions taken are the same corrective actions; and responsive to determining that the eNB has exceeded the pre-defined threshold for corrective actions performed during the pre-defined period of time, suspending, by the monitoring application, further automated corrective actions for the eNB.

16. The method of claim 15, wherein the pre-defined threshold for corrective actions during the pre-defined period of time comprises one corrective action, five corrective actions, ten corrective actions, fifty corrective actions, and one-hundred corrective actions.

17. The method of claim 15, wherein the pre-defined period of time comprises one day, one week, one month, six months, and one year.

18. The method of claim 15, wherein the plurality of eNBs function as a part of a radio access network (RAN).

19. The method of claim 15, wherein the NMS monitors other communication devices.

20. The method of claim 19, wherein the other communication devices comprise wireless nodes, routers, communication gateways, and other communication servers.

\* \* \* \* \*